United States Patent Office 2,744,906
Patented May 8, 1956

2,744,906

PROCESS FOR THE PRODUCTION OF THE THIO-SEMICARBAZONE ISONICOTINALDEHYDE

Hans-Bodo König and Hans-Albert Offe, Wuppertal-Elberfeld, Germany, assignors to Schenley Industries, Inc., New York, N. Y., a corporation of Delaware No Drawing. Application September 2, 1954, Serial No. 453,939

Claims priority, application Germany October 30, 1953

10 Claims. (Cl. 260—294.8)

The present invention relates, generally, to a new and improved process for the production of the thiosemicarbazone of isonicotinaldehyde represented by the formula:

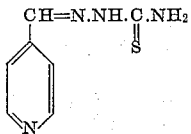

It is known that the group of thiosemicarbazones of isomeric pyridine carboxaldehydes represented by the general formula:

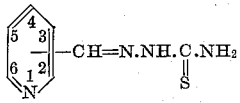

are, to varying degrees, possessed of physiological activity that makes them useful therapeutic agents in the treatment of tuberculosis infections, such, for example, as infections caused by the microorganism *Mycobacterium tuberculosis*.

In particular, it has been determined as a result of in vitro and in vivo investigations that the thiosemicarbazone of isonicotinaldehyde (4-pyridine carboxaldehyde) is the most effective tuberculostatic agent among the isomeric pyridinecarboxaldehyde thiosemicarbazones; its activity being comparable to that of 4-acetaminobenzaldehyde thiosemicarbazone (Tibione I—trade name) in most respects, and superior to the latter compound in treating certain types of tuberculosis infections (see Proc. Soc. Exp. Biology and Medicine, May 1951, vol. 77, pages 47 to 50, E. Grunberg et al.; and J. Org. Chem., 1952, vol. 17, page 555, "Synthetic Tuberculostats III," H. Herbert Fox). Apart from its chemotherapeutic utility, the thiosemicarbazone of isonicotinaldehyde is also useful as a pesticide.

In accordance with heretofore known methods of synthesis, all thiosemicarbazones of pyridine carboxaldehydes are prepared by reacting thiosemicarbazide with pyridine carboxaldehydes (see U. S. Patent No. 2,719,161, issued September 27, 1955), or by decomposition of benzene sulfonic acid derivatives of isonicotinic acid hydrazide in the presence of thiosemicarbazide and ultimate conversion to the thiosemicarbazones (J. Org. Chem., 1952, vol. 17, page 555, H. Herbert Fox, supra). The former synthesis is relatively costly and not well suited for commercial operations owing to the fact that the pyridine carboxaldehyde starting materials are not readily available, whereas the required use of the valuable isonicotinic acid hydrazide in the latter synthesis, renders it impractical for commercial use. Furthermore, the latter process is relatively inefficient from the standpoint of ultimate yields, averaging approximately thirty per cent (30%) of the theoretical.

In accordance with the present invention, we have found that the thiosemicarbazone of isonicotinaldehyde can be prepared quite readily by reacting 4-(trichloromethyl)-pyridine ($\omega,\omega,\omega$-trichloro-$\gamma$-picoline) with thiosemicarbazide in a diluent having acid, basic or neutral properties, at elevated or ordinary room temperatures. In effecting a process of the invention with a neutral diluent, additions which bind hydrogen halides, such, for example, as calcium carbonate, may be employed. Diluents in which the thiosemicarbazone of isonicotinaldehyde is relatively difficultly soluble, and the starting materials readily soluble, such as pyridine, are particularly suitable. We have found that it is preferable to employ substantially equimolecular proportions of the starting material in an acid solution.

The 4-(trichloromethyl)-pyridine employed as a starting material, as represented by the formula;

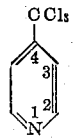

is known in the literature and may be prepared by direct chlorination of 4-methylpyridine ($\gamma$-picoline), as, for instance, with elementary chlorine. Thus, 4-(trichloromethyl)-pyridine is obtained as a colorless oil of boiling point 105–107° C. at 18 mm. pressure, by chlorinating 4-methylpyridine in an acetic acid-sodium acetate mixture (Jour. Chem. Soc. (London), 1951, pages 1145–1149; B. R. Brown, D. Ll. Hammick and B. H. Thewlis).

In order to facilitate a better understanding of the subject matter of this invention, several examples follow, provided by way of illustration only and not by way of limitation of the scope of the invention.

*Example 1*

A mixture of 19.6 parts by weight of 4-(trichloromethyl)-pyridine, 9.1 parts by weight of thiosemicarbazide and 100 parts by volume of N/1 hydrochloric acid was boiled for 6 hours and then left standing at room temperature for 24 hours. An initial precipitate formed and was filtered from the mother liquor by suction filtration. The mother liquor was adjusted to pH 5–6 with sodium hydroxide solution (10%), resulting in a precipitating brown oil which was washed with ether twice after decanting the supernatant solution. The oil was ground with alcohol and the solid compounds filtered as a second precipitate by suction filtration. Both precipitates were combined, dissolved in 60 cc. of cold dilute sodium hydroxide solution, and filtered from the undissolved portions by the addition of charcoal to the solution and filtration of the solution containing the suspended charcoal. The resulting filtrate was adjusted to a pH of about 5 with dilute hydrochloric acid, with the formation of a precipitate which was filtered by suction filtration and recrystallized from boiling methanol. The resulting product was identified by melting point determinations and analysis to be the thiosemicarbazone of isonicotinaldehyde. Decomposition melting point determinations on a Kofler plate and in the melting point tube, yielded values of 240° C.+ and 226–228° C., respectively. The analytical data calculated for $C_7H_8N_4S$ (M. W.=180.22) were:

C=46.65%
H=4.48%
N=31.09%
S=17.79% and were found experimentally to be:

C=46.39%
H=4.58%
N=30.66%
S=17.58%

*Example 2*

A mixture of 19.6 parts by weight of 4-(trichloromethyl)-pyridine, 18 parts by weight of thiosemicarbazide and 100 parts by volume of pyridine was refluxed for 6 hours and cooled in ice. The resulting precipitate was removed by suction filtration, washed with water and dissolved in dilute sodium hydroxide solution. The solution in sodium hydroxide was filtered by suction filtration to separate it from undissolved portions and the filtrate adjusted to a pH of about 5.5 with dilute hydrochloric acid. A precipitate formed and was filtered by suction filtration, washed with water and dried. The yield was 10.7 grams or 60% of the theoretical. The reaction product was purified by recrystallizing from boiling methanol. It was identified as the thiosemicarbazone of isonicotinaldehyde by melting point determinations, analysis and comparison of ultraviolet spectra. The ultraviolet spectrum was identical to that obtained for the compound produced according to the synthesis described by Fox (J. Org. Chem., 1952, vol. 17, page 555). The decomposition melting point determinations obtained on the Kofler plate and in the melting point tube were identical to those obtained for the product of Example 1. The analytical data as determined experimentally are:

$$C = 46.80\%$$
$$H = 4.68\%$$
$$N = 31.04\%$$
$$S = 17.65\%$$

*Example 3*

A mixture of 50 grams of crude (undistilled product) 4-(trichloromethyl)-pyridine and 60 milliliters of dimethylaniline is added dropwise over a two-hour period with stirring to a mixture of 50 grams of thiosemicarbazide and 120 milliliters of N,N-dimethylaniline heated to a temperature of 115° C. The mixture is heated at 115° C. for another six hours with stirring. When the reaction mixture has cooled, it is left to stand for about ten hours at room temperature. A precipitate forms and is drawn off by suction filtration and dissolved in the stoichiometric amount of 7.5 per cent aqueous sodium hydroxide solution. The sodium hydroxide solution is filtered by the addition of charcoal to the solution and filtration of the solution containing the suspended charcoal, the filtrate is adjusted to about pH 6 by the addition of dilute hydrochloric acid, and the mixture cooled in ice water. After allowing it to stand for some time, the thiosemicarbazone of isonicotinaldehyde precipitates and is drawn off by suction filtration and washed with water. The decomposition melting point of the product as determined on the Kofler plate is approximately 230° C. Analysis of the product yielded the following values:

$$C = 45.88\%$$
$$H = 4.65\%$$
$$N = 29.65\%$$
$$S = 17.56\%$$

N,N-dimethyl-p-toluidine may be substituted as a starting material for the N,N-dimethylaniline in the foregoing synthesis but the results are substantially the same.

Having thus described the subject matter of the invention, what it is desired to secure by Letters Patent is:

1. Process for the production of the thiosemicarbazone of isonicotinaldehyde which comprises reacting 4-(trichloromethyl)-pyridine with thiosemicarbazide in a suitable diluent in which both the 4-(trichloromethyl)-pyridine and thiosemicarbazide are soluble, and separating and recovering the reaction product.

2. Process as claimed in claim 1 wherein said diluent is substantially neutral.

3. Process as claimed in claim 1 wherein said diluent is acidic.

4. Process as claimed in claim 1 wherein said diluent is basic.

5. Process as claimed in claim 1 wherein said reaction is conducted at an elevated temperature of about the boiling point of the reaction mixture.

6. Process as claimed in claim 1 wherein said diluent is pyridine.

7. Process as claimed in claim 1 wherein said diluent is a hydrochloric acid solution.

8. Process for the production of the thiosemicarbazone of isonicotinaldehyde which comprises reacting approximately equimolecular proportions of 4-(trichloromethyl)-pyridine and thiosemicarbazide in a solution of hydrochloric acid at an elevated temperature of about the boiling point of the solution, and separating and purifying the reaction product.

9. Process as claimed in claim 1 wherein said diluent is N,N-dimethylaniline.

10. Process as claimed in claim 1 wherein said diluent is N,N-dimethyl-p-toluidine.

References Cited in the file of this patent
UNITED STATES PATENTS 2,676,178    Fox ------------------ Apr. 20, 1954

FOREIGN PATENTS 689,877    Great Britain ------------ Apr. 8, 1953